United States Patent [19]

Eheim

[11] Patent Number: 4,580,538
[45] Date of Patent: Apr. 8, 1986

[54] FUEL INJECTION PUMP SPEED GOVERNOR

[75] Inventor: Franz Eheim, Stuttgart, Fed. Rep. of Germany

[73] Assignee: Robert Bosch GmbH, Stuttgart, Fed. Rep. of Germany

[21] Appl. No.: 700,837

[22] Filed: Feb. 12, 1985

[30] Foreign Application Priority Data

Feb. 16, 1984 [DE] Fed. Rep. of Germany ....... 3405540

[51] Int. Cl.⁴ .............................................. F02D 1/04
[52] U.S. Cl. ..................................... 123/364; 123/365
[58] Field of Search ................................. 123/364–374

[56] References Cited

U.S. PATENT DOCUMENTS

| | | | |
|---|---|---|---|
| 2,865,347 | 12/1958 | Roosa | 123/364 |
| 3,672,385 | 7/1972 | Matzen | 123/373 |
| 3,945,360 | 3/1976 | Laufer | 123/373 |
| 3,974,814 | 8/1976 | Eheim | 123/373 |
| 4,082,073 | 4/1978 | Balogh | 123/365 |
| 4,180,040 | 12/1979 | Hofer et al. | 123/368 |
| 4,403,583 | 9/1983 | Eheim | 123/366 |
| 4,438,746 | 3/1984 | Greiner | 123/373 |
| 4,445,476 | 5/1984 | Eheim | 123/367 |
| 4,505,241 | 3/1985 | Eheim | 123/373 |

Primary Examiner—Magdalen Y. C. Moy
Attorney, Agent, or Firm—Edwin E. Greigg

[57] ABSTRACT

There is proposed a speed governor for a fuel injection pump for internal combustion engines having a governor lever for setting the fuel injection quantity and a governor spring assembly arranged to engage the governor lever and counter to which an rpm-dependent force acts. To compensate for manufacturing tolerances of the governor spring assembly, it is also proposed that the effective length of a spring of the governor spring assembly be varied by realizing one of the supporting parts of the governor spring assembly as a multiple-part element. The supporting part is embodied such that it can be displaced by an adjusting lever in order to vary the pre-stressing of the governor spring, and that the first part is extended coaxially through it out of the interior of the fuel injection pump and can then be rotated in order to adjust the effective length of the governor spring and then fixed in an intended rotational position.

22 Claims, 12 Drawing Figures

FUEL INJECTION PUMP SPEED GOVERNOR

BACKGROUND OF THE INVENTION

The invention is based on a speed governor of the generic type described hereinafter. A speed or rpm governor of this kind is the subject of German Patent Application P No. 33 01 416.7, in which the governor spring is a pre-stressed compression spring disposed between the two supporting parts with those parts being embodied such that they are pressed against one another under the influence of a compression spring. To maintain spacing and accommodate the compression spring, one of the supporting parts is embodied as an actuating rod guided on the other supporting part and coupled to the governor lever.

In this embodiment of the speed governor, the fuel injection pump must be shut off and opened up in order to vary the spring characteristic, that is, the effective length or pre-stressing of the spring. Because of manufacturing tolerances of the various parts of an rpm governor such as the flyweights, and because of the governor spring characteristic, component part tolerances and installation tolerances, deviations in the speed droop, or P degree, occur—that is, deviations in the breakaway curve upon attaining the maximum rpm. Especially in internal combustion engines provided for driving engine-generator sets, the associated fuel injection pump must be regulated very accurately, and the P degree in particular must be adhered to very exactly.

OBJECT AND SUMMARY OF THE INVENTION

The speed governor according to the invention has the advantage over the prior art that the manufacturing tolerances that arise can be compensated for by varying the spring characteristic of the governor spring assembly, in fact highly accurately and while the fuel injection pump is operating, so that every dynamic aspect can be taken into account. The speed governor according to the invention has the additional advantage that the adjustment requires considerably less effort. The adjustment is simple to perform, yet the speed governor embodied according to the invention does not disadvantageously affect the structural size of the fuel injection pump. This is true particularly when the speed governor is used in distributor-type fuel injection pumps, where a small structural size is a particularly important goal.

Moreover, there is disclosed an embodiment whereby it is possible to shorten the active spring length without changing the pre-stressing of the spring. On the other hand, an intentionally performed change in the pre-stressing can, however, also be attained. As taught herein, an apparatus is realized in which the effective length of the governor spring can be adjusted particularly easily and quickly.

The rpm governor according to the invention can be realized both in variable-speed governors and in idling-speed and maximum-speed governors as provided by this disclosure. If the invention is used in variable-speed governors, the teachings in this application considerably reduce the force exerted on the piston by the fluid pressure in the interior of the fuel injection pump, with a resultant force that counteracts the tensile force of the spring of the governor spring assembly. In this manner, the adjusting forces for changing the pre-stressing of the governor spring are kept quite small.

Furthermore, in an advantageous manner, a further embodiment makes it possible to substantially reduce the mass of the effective governor lever for the idling range.

There is also disclosed in a still further embodiment that a damping of spring vibrations can be accomplished by coating the surface of the mandrel with a plastic material or covering the same with a plastic sheath.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
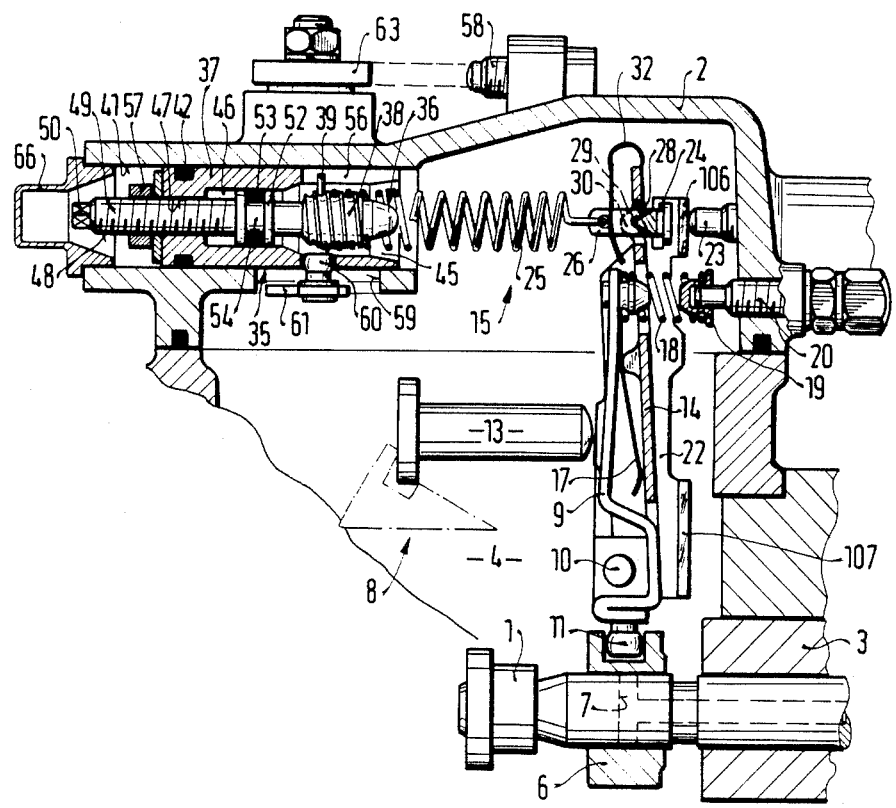
FIG. 1 is a fragmentary section taken through a distributor-type fuel injection pump of known design, showing the essential elements of the speed governor.

In the drawing in FIG. 1, a portion of a distributor-type fuel injection pump of known design is shown, having a pump piston 1, which is made to reciprocate and rotate by means not otherwise shown and is guided in a bushing 3 inserted in the housing 2 of the fuel injection pump. The housing encloses a pump suction chamber 4, which is filled with fuel; this fuel is generally kept at a pressure controlled in accordance with rpm, in order to perform control functions. An annular slide 6 is disposed on the pump piston and acts as a quantity adjusting member, controlling the mouth of a relief line 7, extending from a pump work chamber not shown, into the pump suction chamber. To this end, the annular slide 6 is displaceable on the pump piston, and in the illustrated embodiment the fuel injection quantity delivered per pumping stroke is greater, the farther the annular slide is displaced toward the right with respect to top dead center of the pump piston.

For adjusting the annular slide 6, a speed governor is provided which has a governor lever 9, which is rotatable about an adjustable shaft 10 that is substantially integral with the housing; the governor lever 9 is coupled at one end, via a head 11, to the annular slide 6 and thereby adjusts it. This governor lever may in principle be a single governor lever, but in the exemplary embodiment a governor lever assembly having a plurality of levers is provided. The governor lever 9 is a starting lever, which is acted upon directly by an adjusting sleeve 13 of a centrifugal governor 8, the latter shown only symbolically in the drawing. A one-armed drag lever 14 is also disposed on the shaft 10 and its outermost end is engaged by a governor spring assembly 15, which acts counter to the force exerted by the adjusting sleeve 13. With the imposition of the adjusting force of the adjusting sleeve 13, the starting lever 9 can be brought into contact with the drag lever 14. A starting lever 17 in the form of a leaf spring is disposed between the starting lever and the drag lever and is compressed during this operation. An idling governor spring 18 embodied as a compression spring is articulatedly connected to the end nearer the adjusting sleeve of the arm of the governor lever 9, being supported on an adjustable stop 19 integral with the housing. This stop 19 has a screw 20 which is screwed through the wall of the housing 2 and is adjustable and fixable in position from outside. The shaft 10 common to both the starting lever and the drag lever is supported on an adjusting lever 22, which is pivotable in a manner not shown here, for instance counter to spring force, about a housing point 109 (FIG. 12) in order to adjust the shaft 10. The adjustment is likewise effected by means of a screw 23 which is screwed through the housing wall and engages the end of the adjusting lever.

Figure 4:
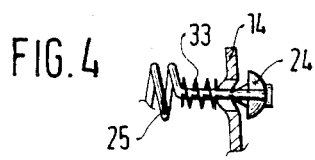
FIG. 4 shows a variant manner of joining the first supporting part of the spring of the governor spring assembly according to FIG. 1 to the governor lever.

In the illustrated exemplary embodiment, the governor spring assembly comprises a tension-loadable helical spring one end of which is coupled to a first supporting part 24. This part 24 comprises a perforated connecting tang 26, on which the end of the governor spring 25 is suspended and which passes through a recess 28 of the drag lever; on the end remote from the governor spring, on the other side of the drag lever, the connecting tang 26 has a knife edge 29 extending parallel to the shaft 10. The knife edge 29 engages a corresponding indentation 30 in the vicinity of the recess 28 of the drag lever 14. The connection of the supporting part 24 to the drag lever 14 is secured by a spring clip 32 which is secured to the drag lever. The spring clip 32 acts as a compression spring and is supported on the fastening point of the governor spring 25. Alternatively, a helical compression spring 33 may also be fastened between the drag lever and the governor spring, as shown in FIG. 4.

The other end of the governor spring 25 is connected to a second supporting part 35, which is in several parts and comprises a first part 36, disposed coaxially with a second part embodied as a hollow piston 37.

On its end pointing toward the pump suction chamber, the first part 36 has an external thread 38, which in pitch and pitch direction matches the windings of the governor spring 25 and onto which this governor spring is threaded. The hollow piston 37 is guided in a bore 41 in the wall of the housing 2. The bore 41 is embodied as a through bore extending through the wall of the housing, and the hollow piston 37 has a seal 42 on its outward-pointing end, which tightly seals off the pump suction chamber 4 from the outside. The hollow piston 37 also has an axial through bore, which is embodied as a multiple-part stepped bore and comprises a first bore section 45 of larger diameter, nearer the pump suction chamber, adjoined by a guide bore section 46 of smaller diameter, and arranged to merge with a threaded bore 47 of still smaller diameter which discharges at the outside. The other end 49 of the first part 36 is provided with a second thread 48 and is screwed through this threaded bore section 47, and on its outer end there is a molded part 50 for purposes of rotation. In the vicinity of the guide bore section 46, the first part 36 has a collar 52 with an outer annular groove 54 receiving a seal 53. In this manner, despite the displaceability of the first part, the tightness of the pump suction chamber 4 is assured. On the end adjoining the collar 52 nearer the pump suction chamber, the first part 36 has a thread 38, which is located in the vicinity of the bore section 45 of the hollow piston 37. In this area, the piston has a longitudinal slit 56, which is engaged by a bent end 39 of the governor spring 25.

The first part 36 disposed coaxially with the piston 37 can be rotated relative to the piston by means of the above-described arrangement, whereupon the governor spring 25 is threaded onto the thread 38 to a greater or lesser extent. The governor spring is fixed in the rotational direction by the guided end 39. The attained adjustment of the first part 36 is secured, for instance, by a lock nut 57 threaded onto the end 49 from the outside.

To vary the pre-stressing of the governor spring 25, the first part 36 and the piston 37 are displaceable together in the bore 41, to which purpose an opening 59 is provided in the wall of the bore, through which opening a driving pin 60 located on the end of a lever 61 passes and engages a recess in the wall of the piston 37. The driving pin thereby serves simultaneously as an anti-torsion means for the hollow piston 37.

Figure 2:
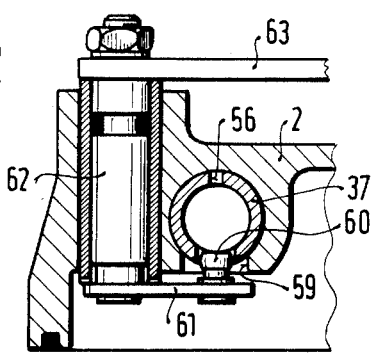
FIG. 2 shows a detail of the adjusting mechanism for adjusting the pre-stressing of the governor spring of the speed governor of FIG. 1.

From FIG. 2 it is clear that the lever 61 is connected to an adjusting lever shaft 62, which is supported in the wall of the housing 2 and on its outer end has an adjusting lever 63, which is adjustable arbitrarily between a full-load stop 58 and an idling stop, not shown.

Figure 3:
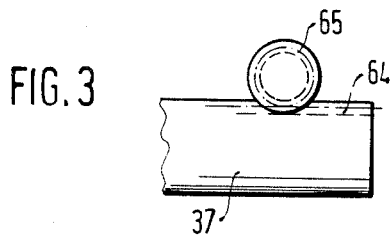
FIG. 3 shows a variant of the embodiment of FIG. 2.

Alternatively, the adjustment of the piston 37 can be effected as shown in FIG. 3, where the piston has on its surface a set of gear teeth, indicated at 64 which continue in the axial direction and with which a pinion 62 mounted on the end of the adjusting lever shaft 62 meshes. This embodiment has the advantage that any rotation, even if negligibly slight, of the piston 37 and the first part 36 when the piston 37 is displaced is avoided.

The governor shown here is a variable-speed governor, in which the pre-stressing of the governor spring 25 can be varied by adjusting the adjusting lever 63. Depending on the position of the adjusting lever, the starting lever 9 together with the drag lever 14 is deflected at a higher or lower rpm, and the annular slide 6 is put into a position where it opens the relief conduit 7 at a relatively short pump piston delivery stroke, so that the fuel injection quantity is reduced in order to maintain the limit rpm established by the pre-stressing of the spring. The steepness of the curve representing the regulation of the fuel injection quantity when the limit rpm is reached depends on the spring characteristic, which now is easily adjustable from outside the fuel injection pump while the pump is running by rotating the first part 36, after loosening the lock nut 57. Once the adjustment has been effected to the desired position, the end of the bore 41 can be closed by a protective cap 66. If the governor spring 25 is fully relieved in the range of idling operation, the first supporting part 24 is held in continuous contact with the drag lever 14 by the spring 32 or 33, thereby avoiding disengagement. The knife-edge bearing reduces frictional forces where the governor ring is suspended, thereby reducing retroactive moments on the governor spring at various positions of the drag lever, which can have a disadvantageous effect on the governor spring characteristic and on the resultant speed regulation. Idling regulation is effected by means of the separate idling spring 18 supported firmly on the housing and acting parallel to the starting lever 17. The starting leaf spring effects a maximum stroke of the annular slide when the adjusting sleeve 13 is retracted by separating the governor lever 9 from the drag level 14 during starting.

To adjust the characteristic, the second thread 48 preferably has the same pitch as the first thread 38 on the first part 36. Thus when the first part is rotated, the pre-stressing of the spring is not changed, so that the idling and full-load stops of the adjusting lever 63 can be retained while a correction of the governor spring characteristic is being performed. However, it is also conceivable that it may at the same time be necessary to change the basic pre-stressing of the governor spring; to that end, the second thread may have a pitch different from that of the first, while having the same pitch direction, or it may even have an opposite pitch direction from that of the first thread 38.

Figure 5:
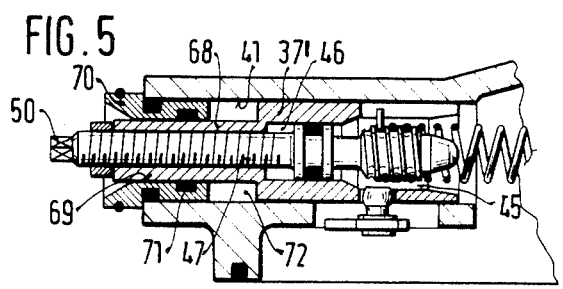
FIG. 5 shows a fourth exemplary embodiment of the invention having pressure equalization at the pistons which vary the pre-stressing of the governor spring.

During fuel injection pump operation the piston 37 is exposed to the rpm-dependent suction chamber pressure, which is in the opposite direction from the operative direction of the governor spring 25. At higher rpm levels, the resultant force that acts upon the adjusting lever 63 can become quite large. An advantageous embodiment of the invention therefore provides, as shown in FIG. 5, that the hollow piston 37' is embodied on the outside as a stepped piston, having an axial bore 45, 46, 47 embodied in the same way as in FIG. 1, but with a piston part 68 of reduced diameter on the end of the piston 37' remote from the suction chamber. The piston part 68 is guided through a guide bore 69 of a closure piece 70 inserted into the bore 41 and is sealed off from the outside by a seal 71. A pressure chamber 72 is thus formed between the closure piece 70, the piston 37' and the bore 41, which is subjected to the pressure of the pump suction chamber 4. The effective surface area of the piston 37', and hence the maximum adjusting force at the adjusting lever 63, can thus be considerably reduced. The design may be such that when the maximum full-load rpm is attained the pre-stressing force of the governor spring 25 and the resultant hydraulic force exerted upon the piston are in equilibrium.

Figure 6:
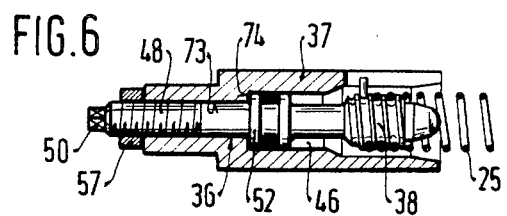
FIG. 6 shows a fifth exemplary embodiment, having a variant manner of adjusting the first part of the first supporting part of the spring.

FIG. 6 shows a variant for adjusting and fixing the position of the first part 36. The axial bore in the piston 37 here has, instead of the threaded bore, a through bore 73 adjacent to the guide bore section 46, and a shoulder 74 is formed between the guide bore section 46 and the through bore 73. After each adjustment performed with the molded part 50, in order to fix the first part 36 so that it will not rotate, this part 36 is brought with its collar 52 against the shoulder 74 and fixed in place there by screwing the lock nut 57 onto the second thread 48. In this exemplary embodiment, the pre-stressing of the governor spring 25 also varies with the adjustment of the effective spring length in accordance with the rotation effected, which in many cases can facilitate the correction.

Figure 7:
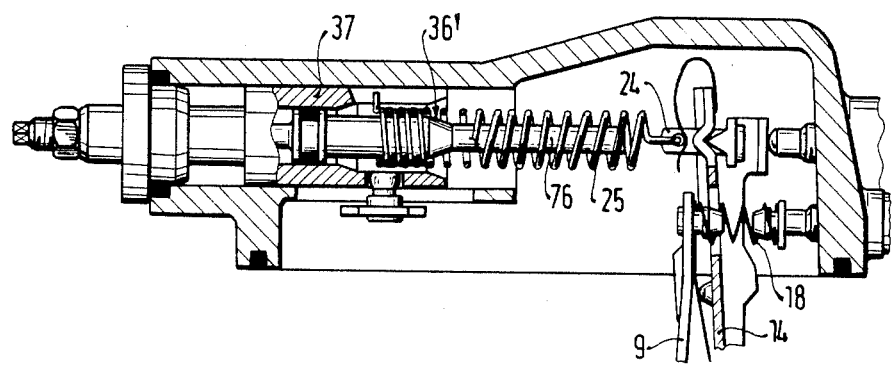
FIG. 7 shows a sixth exemplary embodiment, having a mandrel on the first part of the first supporting part of the governor spring for stopping the movement of a portion of the governor lever.

The exemplary embodiment of FIG. 7 is substantially identical in structure to that of FIG. 5, except that here the first part 36', in an axial extention in the direction toward the pump suction chamber 4, has a mandrel 76 which extends coaxially with the axis of the governor spring. When the piston 37 is moved to adjust idling operation, the mandrel 76 comes into contact with the first supporting part 24 and thereby puts the drag lever 14 out of the operative range of the starting lever 9. Since the idling governor spring 18 also engages the starting lever 9, the regulation of the idling injection quantity is effected solely by means of the starting spring 9, which has the advantage that the mass of the governor assembly that is now operative is reduced considerably, and a very sensitive idling regulation can be effected.

Figure 8:
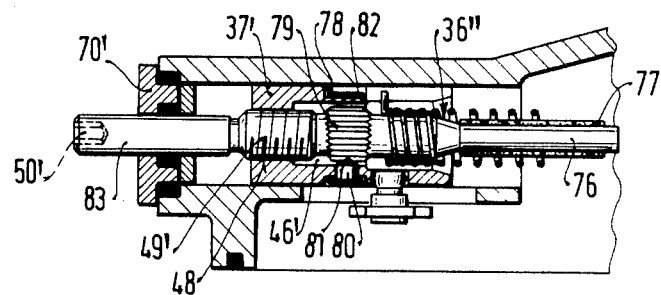
FIG. 8 shows a seventh exemplary embodiment with a ratchet-like anti-torsion means for the first part.

To damp spring vibrations on the part of the governor spring 25, the mandrel 76 may furthermore, as shown in FIG. 8, be covered with a plastic sheath 77 or coated with plastic. The governor spring that comes into contact with this coating is braked or damped thereby.

The embodiment of FIG. 8 includes a further variant. Here, instead of the collar 52 with the groove 54 and seal 53 in the vicinity of the guide bore section 46' on the jacket face of the part 36", a set of face gear teeth or knurling 79 is provided, which extends in the circumferential direction. Radially thereto, a retainer 80 passes through the wall of the piston at the guide bore section 46'. The retainer 80 has a shaped tip 81, having flanks inclined toward the gear teeth, and at the opposite end it is acted upon by an annular spring 82, which is inserted into an outer annular groove 78 of the piston 37'. By means of this annular spring, the retainer is held in the gear teeth or knurling 79, so that the part 36" cannot be rotated further until the retaining force has been overcome. As in the exemplary embodiment of FIG. 1, the adjacent end 49' of the first part 36" has the second thread 48, by way of which it is screwed into the piston 37'. For sealing purposes, an end 83 adjacent thereto, of this embodiment of the first part 36", is embodied as a cylindrical shaft, which is guided to the outside in a sealed manner by means of a closure piece 70' of the type shown in FIG. 5. The outwardly protruding end has a molded part 50', for rotating the first part 36" counter to the retaining force of the retainer 80. With this embodiment, the adjustability of the spring characteristic is still further facilitated substantially, because there is no anti-torsion means, for instance in the form of a lock nut as in FIGS. 1, 5 and 6, that has to be loosened before the adjustment can be performed and then tightened once again thereafter. The set of face gear teeth 79 is designed to be as wide as the expected adjustment travel of the first part. Otherwise the speed governor has the same structure as in the exemplary embodiment described earlier.

Figure 9:
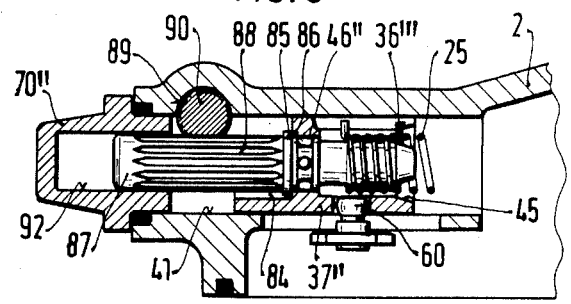
FIG. 9 shows an eighth exemplary embodiment of the invention, with a modified anti-torsion means for the first part.
Figure 10:
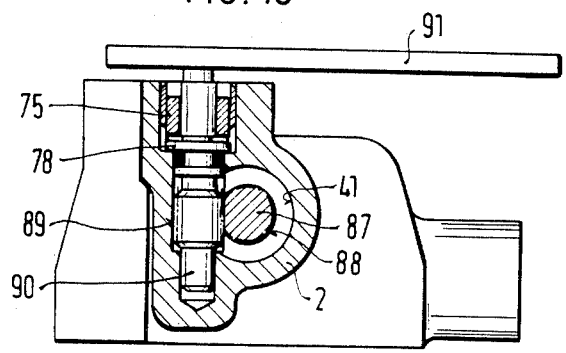
FIG. 10 is a section taken through the exemplary embodiment of FIG. 1 in a sectional plane at right angles to FIG. 9.

A variant of the embodiment of FIG. 8 is shown in FIGS. 9 and 10. The hollow piston 37" used here is embodied in the same way as in the foregoing exemplary embodiments toward the side of the pump suction chamber. Thus it is likewise displaceable in the bore 41 by means of the driving pin 60, which in the foregoing embodiments serves at the same time to fix the piston in the rotational direction. The first bore section 45 is adjoined, in this embodiment of the piston 37", by a guide bore section 46" of smaller diameter. The guide bore section here is kept relatively short and then merges with a bore section 84 of larger diameter. The first part 36''' of the second supporting part is embodied in this case such that in the vicinity of the guide bore section 46'' it forms a slide bearing therewith, and adjacent thereto, in the vicinity of the bore section 84, it has a collar 85, which under the influence of the governor spring 25 is retained on a shoulder 86 formed between the guide bore section 46'' and the bore section 84. It may also be fixed with a pin that engages an annular groove. The remaining portion 87 of the first part 36''' has on its surface, continuing in the circumferential direction, an axially parallel set of face gear teeth 88, which meshes with thread 89 on a shaft 90 that extends transversely to the longitudinal axis of the first part. The shaft 90 is secured in the axial direction and is extended out of the housing 2 of the fuel injection pump, where it has an adjusting lever 91 by means of which the shaft, and simultaneously the first part 36''' as well, can be rotated. For preventing torsion, a collar 78 of the shaft 90 is pressed via a hollow nut 75, which is guided over the end of the shaft 90, onto a shoulder at the recess in the pump housing which receives the shaft 90. In this case, the adjusting lever 91 is embodied attachably. In a suitable realization, loosening the hollow nut before adjustment becomes unnecessary, because the circumferential forces on the shaft 90 are small, and the shaft 90 can be supported in a self-inhibiting manner because of frictional engagement. For improved guidance, the remaining portion 87 is guided at its outermost end in a bore 92 located in a closure piece 70'' of the bore 41.

In this exemplary embodiment, the adjustment of the effective spring length of the governor spring 25 is facilitated considerably, although when the effective governor spring length is adjusted the pre-stressing is varied as well. However, this can be compensated for by changing the stop 58 of the adjusting lever 63 (see FIG. 1). The first part 36''' is fixed in its axial position in a simple manner by the cooperation of the collar 85 and the governor spring 25.

Figure 11:
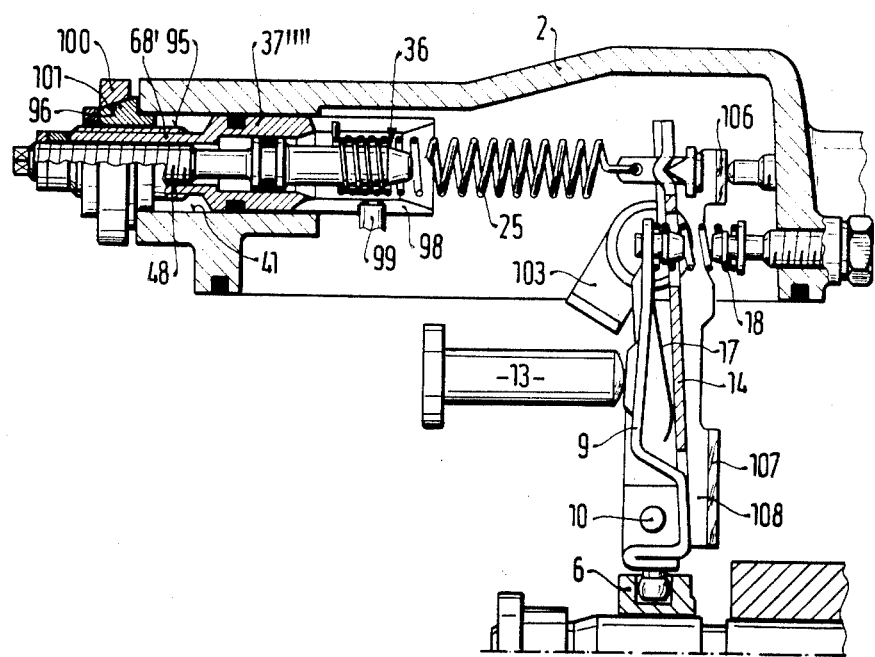
FIG. 11 shows a ninth exemplary embodiment for use in an idling-speed and maximum-speed governor.
Figure 12:
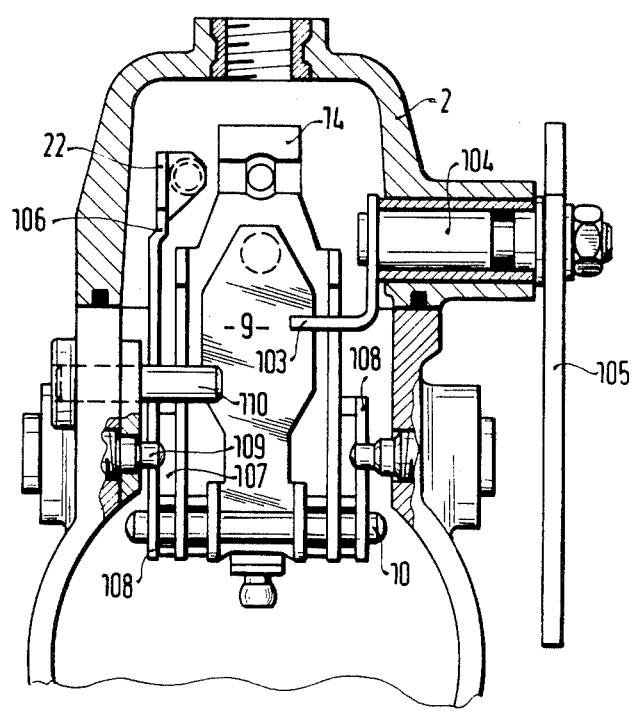
FIG. 12 is a second view of the exemplary embodiment according to FIG. 11.

A last variant according to FIGS. 11 and 12 shows the use of the speed governor as an idling-and maximum-speed governor with a simple structure. Initially the speed governor is identical in structure to the embodiment of FIG. 5, with a modified piston 37''''. On a piston part 68'' extending outward and modified from the piston part 68 of FIG. 5, this piston 37'''' has an external thread 95, onto which an adjusting nut 96 is screwed and which is further supported on the housing 2 of the fuel injection pump at the end of the bore 41. The piston 37'''' is furthermore radially sealed off from the bore 41 and has a second longitudinal groove 98, which secures the piston 37'''' against twisting. Since the first part 36 is joined to the piston 37'''' via the second thread 48, the force of the governor spring 25 is also exerted upon the piston 37'''' and keeps the adjusting nut 96 in contact with the housing 2. By rotating the adjusting nut 96, the axial position of the piston 37'''', and simultaneously the pre-stressing of the governor spring 25, can be varied. Since in the pump embodied in this way this pre-stressing controls the cutoff when maximum rpm is attained, it is no longer necessary to displace the piston 37'''' once the adjustment has been set. The rotational position of the nut 96 which determines the pre-stressing can be fixed by suitable means, for instance by placing a flange 100 with a conical seating surface 101 upon the nut 96. With this embodiment, the minutest possible variations in rotational position of the nut can be fixed, without endangering the established setting as a result of the fixation operation. Once the adjustment has been attained, the flange 100 is then screwed to the pump housing in a manner not shown.

To control fuel quantity, the pump type shown in FIG. 11 has a setting lever 103, which extends transversely to the drag lever 14 and to the starting lever 9 and is mounted on a shaft 104 guided through the wall of the housing 2. The end of the shaft 104 which leads to the outside bears an adjusting lever 105, by means of which the fuel injection quantity can be varied. The setting lever 103 engages the starting lever 9 and the drag lever 14 from underneath from the direction of the adjusting sleeve 13 of the speed governor and thereby enables a deflection of one or both governor levers counter to the force of the governor spring 25. In full-load operation, the setting lever 103 is not in contact with one of the governor levers, so that the strong pre-stressing of the governor spring 25 acts upon the starting lever 9 via the drag lever 14, and the fuel injection pump pumps the maximum fuel injection quantity until the maximum full-load rpm or breakaway point is reached. In the case of the breakaway point, the force of the adjusting sleeve 13 is greater than the pre-stressing of the governor spring 25, and the governor lever is deflected counter to the spring force.

During idling operation, only the drag lever 14 is deflected, up to a certain extent, by the setting lever 103, so that the starting lever can move counter to the force of the starting lever 18 without any influence by the main governor spring 25. With the setting lever, a shutoff of the fuel delivery is also possible, by rotating the setting lever far enough that it deflects both the drag lever 14 and the starting lever 9 counter to the force of the governor spring 25, until the annular slide 6 attains a position corresponding to the zero fuel supply quantity.

In FIG. 12, a view of the governor lever is provided as seen from the side of the adjusting sleeve 13. In this view, the adjusting lever 22 mentioned in connection with FIG. 1 can be seen, there further being shown an adjusting arm 106 and a U-shaped part 107, the two arms 108 both of which are supported laterally on bearing pins 109 which protrude from the interior of the housing of the injection pump. The shaft 10 on which the drag lever 14 and the starting lever 9 are seated is guided by arms 108. A full-load stop 110 is also provided, limiting the deflection of the drag lever 14 in the direction toward the spring 25.

If the flange 100 is replaced with an adjusting lever which is firmly connected to the adjusting nut 96 and if the setting lever is omitted, then the governor embodied as shown in FIGS. 11 and 12 can also be used as a variable-speed governor; setting the pre-stressing of the governor spring 25 in accordance with the desired rpm is then accomplished by rotating the adjusting nut 96, given an appropriately matched thread 95.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A speed governor of a fuel injection pump for internal combustion engines comprising a housing, a governor lever therein for setting fuel supply quantity, an rpm-dependent force arranged to engage said governor lever, a governor spring assembly means disposed between said governor lever and an adjustable supporting part that is arranged to vary pre-stressing, one spring of said assembly being disposed between a first supporting part coupled to said governor lever and said adjustable supporting part, said one spring having an outer circumference, further wherein said governor spring is coupled in a rotationally fixed manner with one of said supporting parts and further includes one end which engages a first thread on a first part of said adjustable supporting part, said first part including a terminus, further wherein said first part is rotatable about the axis of said thread relative to another part of the said adjustable supporting part, and wherein said other part is a piston secured against torsion and guided in a bore in said housing, said piston having a continuous axial bore which is axially adjustable by means of an adjustable device operable exteriorly of said pump housing and further arranged to receive said first part of said adjustable supporting part, said first part arranged to protrude from said piston and further to be rotatable exteriorly of said housing and further that said piston in proximity to said terminus of said first part has a longitudinally extending guide which cooperates with means offstanding from said outer circumference of said one spring of said assembly.

2. A speed governor as defined by claim 1, wherein said first part has a second threaded area via which it is in operative engagement with said piston.

3. A speed governor as defined by claim 2, wherein said first part further includes a shoulder which can be brought into a positively engaged connection with said piston by screwing a retaining nut onto said second thread.

4. A speed governor as defined by claim 2, wherein said piston further includes an axially threaded bore and said first part is rotatably and longitudinally fixable therein.

5. A speed governor as defined by claim 4, wherein said threaded bore has a thread pitch which matches said second thread.

6. A speed governor as defined by claim 4, wherein said second thread has a pitch differing in amount and/or direction from a pitch of said first thread.

7. A speed governor as defined by claim 4, wherein said first part is secured against inadvertent movement by a lock nut which is brought into close proximity to said piston.

8. A speed governor as defined by claim 4, wherein said first part is provided with a knurled area which cooperates with a retainer means that extends in a rotational direction of said first part.

9. A speed governor as defined by claim 8, wherein said retainer means comprises a shaft which extends transversely relative to a longitudinal axis of said first part, said shaft provided with a knurled area complemental to said knurling on said first part.

10. A speed governor as defined by claim 9, wherein said first part is fixed in said axial bore of said piston, said first part further being rotatable and simultaneously fixable in its rotational position via said retainer means.

11. A speed governor as defined by claim 8, wherein said retainer means further comprises a spring means arranged to support a rotation prevention means which is guided by said piston, said rotation prevention means further including means inclined relative to the direction of rotation of said first part.

12. A speed governor as defined by claim 4, wherein said piston is coupled via a pin with an actuation lever, said lever being mounted on a shaft which extends from said pump housing, said shaft further rotatable by means of an adjusting lever.

13. A speed governor as defined by claim 12, wherein said bore for guiding said piston further includes an opening arranged to receive said pin, whereby actuation of said piston is achieved.

14. A speed governor as defined by claim 4, wherein said piston has a threaded area which projects outwardly of said housing and an adjustable lock nut is secured on said threaded area.

15. A speed governor as defined by claim 14, wherein said piston further includes a jacket surface, a guide groove in said jacket surface and a guide element in said housing arranged to engage said guide groove.

16. A speed governor as defined by claim 14, wherein said adjustable lock nut further includes a conical seating surface, upon which a flange connectable with said pump housing is seated.

17. A speed governor as defined by claim 14, wherein said nut is secured against torsion and said governor lever is movable into various positions by means of an arbitrarily adjustable setting lever counter to the restoring force of said governor spring.

18. A speed governor as defined by claim 12, wherein said piston further includes an area having a reduced diameter, said reduced diameter of said piston arranged to penetrate a closure means positioned in said bore, and a sealed chamber between said piston and said closure means.

19. A speed governor as defined by claim 4, wherein said first supporting part has a knife edge which engages said governor lever in an identation on a side remote from said governor spring, said knife edge further arranged to extend parallel to a pivoting shaft of said governor lever and further wherein said first supporting part includes a connecting tang which extends through said governor lever, and said governor spring secured to said connecting tang.

20. A speed governor as defined by claim 19, wherein a compression spring is provided between said governor spring and said governor lever.

21. A speed governor as defined by claim 4, wherein said governor lever further includes a double-lever assembly comprising a pivotable starting lever, which is coupled with a quantity adjusting device and an adjustable idling governor spring supported firmly on said housing, a pivotable drag lever actuatable by said starting lever said drag lever having a portion which is engaged by said first supporting part, said first part provided with a mandrel which protrudes beyond said piston coaxially of said governor spring and said mandrel further arranged to contact said first supporting part upon the displacement of said piston to thereby remove said drag lever out of the operative range of said starting lever.

22. A speed governor as defined by claim 21, characterized in that the surface of the mandrel is coated with plastic material.

* * * * *